(12) United States Patent
Burlet et al.

(10) Patent No.: US 7,295,150 B2
(45) Date of Patent: Nov. 13, 2007

(54) METHODS AND SYSTEMS FOR IDENTIFYING HIGH-QUALITY PHASE ANGLE MEASUREMENTS IN AN INTERFEROMETRIC RADAR SYSTEM

(75) Inventors: Todd R. Burlet, Maple Grove, MN (US); Tika M. Kude, Plymouth, MN (US); James B. Oven, Maple Grove, MN (US); Timothy J. Reilly, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 213 days.

(21) Appl. No.: 11/237,231

(22) Filed: Sep. 28, 2005

(65) Prior Publication Data

US 2007/0222667 A1    Sep. 27, 2007

(51) Int. Cl.
*G01S 13/08* (2006.01)
*G01S 7/40* (2006.01)

(52) U.S. Cl. .............. 342/120; 342/121; 342/123; 342/127; 342/139; 342/140; 342/146; 342/147; 342/156; 342/173; 342/174

(58) Field of Classification Search ........ 342/120–123, 342/127, 139, 140, 145–147, 156, 173, 174, 342/189, 195

See application file for complete search history.

(56) References Cited

U.S. PATENT DOCUMENTS

| | | | |
|---|---|---|---|
| 5,170,171 A | 12/1992 | Brown | |
| 5,189,424 A | 2/1993 | Brown | |
| 5,260,708 A | 11/1993 | Auterman | |
| 5,936,575 A * | 8/1999 | Azzarelli et al. | ............ 342/362 |
| 5,999,129 A * | 12/1999 | Rose | ........................... 342/394 |
| 6,011,505 A | 1/2000 | Poehler et al. | |
| 6,313,794 B1 * | 11/2001 | Rose | ........................... 342/424 |
| 6,639,545 B1 | 10/2003 | Hager et al. | |
| 6,674,397 B2 * | 1/2004 | Hager et al. | ................. 342/159 |
| 6,680,691 B2 * | 1/2004 | Hager et al. | ................. 342/127 |
| 6,738,563 B1 * | 5/2004 | Hager et al. | ................. 342/147 |
| 6,791,493 B1 * | 9/2004 | Rose | ........................... 342/442 |
| 6,856,279 B2 | 2/2005 | Hager et al. | |

(Continued)

FOREIGN PATENT DOCUMENTS

JP        62034088 A  *  2/1987

OTHER PUBLICATIONS

"Determination of absolute interferometric phase using the beam-amplitude ratio technique", Bickel, D.L.; Hensley, W.H., IGARSS '96. 'Remote Sensing for a Sustainable Future.', vol. 4, May 27-31, 1996 (s):2063-2067.*

(Continued)

*Primary Examiner*—John B Sotomayor
(74) *Attorney, Agent, or Firm*—Fogg & Powers LLC

(57) ABSTRACT

A method for determining a mechanical angle to a radar target utilizing a multiple antenna radar altimeter is described. The method comprises receiving radar return signals at the multiple antennas, populating an ambiguity resolution matrix with the electrical phase angle computations, selecting a mechanical angle from the ambiguity resolution matrix that results in a least amount of variance from the electrical phase angle computations, and using at least one other variance calculation to determine a quality associated with the selected mechanical angle.

20 Claims, 12 Drawing Sheets

U.S. PATENT DOCUMENTS

| | | |
|---|---|---|
| 6,894,640 B1 | 5/2005 | Hager et al. |
| 6,897,804 B1* | 5/2005 | Hager et al. ................ 342/120 |
| 6,950,056 B2 | 9/2005 | Hager et al. |
| 2003/0210176 A1* | 11/2003 | Hager et al. ................ 342/118 |

OTHER PUBLICATIONS

"Ambiguity Resolution in Interferometry", Jacobs, E.; Ralston, E.W. Aerospace and Electronic Systems, IEEE Transactions on vol. AES-17, Issue 6, Nov. 1981 pp. 766-780.*

* cited by examiner

| Antenna Pair | Measured Angle minus 4π radians | Measured Angle minus 2π radians | Measured Angle | Measured Angle plus 2π radians | Measured Angle plus 4π radians |
|---|---|---|---|---|---|
| $\theta_{1\_2}$ | N/A | $\theta^1 = (\theta_{1\_2} - 360°)$<br>$\phi^1 = ASin(\theta^1/K1)$ | $\theta^1 = (\theta_{1\_2})$<br>$\phi^1 = ASin(\theta^1/K1)$ | $\theta^1 = (\theta_{1\_2} + 360°)$<br>$\phi^1 = ASin(\theta^1/K1)$ | N/A |
| $\theta_{2\_3}$ | $\theta^2 = (\theta_{2\_3} - 720°)$<br>$\phi^2 = ASin(\theta^2/K2)$ | $\theta^2 = (\theta_{2\_3} - 360°)$<br>$\phi^2 = ASin(\theta^2/K2)$ | $\theta^2 = (\theta_{2\_3})$<br>$\phi^2 = ASin(\theta^2/K2)$ | $\theta^2 = (\theta_{2\_3} + 360°)$<br>$\phi^2 = ASin(\theta^2/K2)$ | $\theta^2 = (\theta_{2\_3} + 720°)$<br>$\phi^2 = ASin(\theta^2/K2)$ |
| $\theta_{1\_3}$ | $\theta^3 = (\theta_{1\_3} - 720°)$<br>$\phi^3 = ASin(\theta^3/K3)$ | $\theta^3 = (\theta_{1\_3} - 360°)$<br>$\phi^3 = ASin(\theta^3/K3)$ | $\theta^3 = (\theta_{1\_3})$<br>$\phi^3 = ASin(\theta^3/K3)$ | $\theta^3 = (\theta_{1\_3} + 360°)$<br>$\phi^3 = ASin(\theta^3/K3)$ | $\theta^3 = (\theta_{1\_3} + 720°)$<br>$\phi^3 = ASin(\theta^3/K3)$ |

FIG. 6

METHODS AND SYSTEMS FOR IDENTIFYING HIGH-QUALITY PHASE ANGLE MEASUREMENTS IN AN INTERFEROMETRIC RADAR SYSTEM

STATEMENT REGARDING FEDERALLY SPONSORED RESEARCH & DEVELOPMENT

The United States Government has acquired certain rights in this invention pursuant to Contract No. N00019-01-C-0033 issued by the Department of the Navy.

BACKGROUND OF THE INVENTION

This invention relates generally to radar systems, and more specifically to a radar system which is capable of determining the phase angle of radar return signals.

The proper navigation of an aircraft in all phases of its flight is based to a large extent upon the ability to determine the terrain and position over which the aircraft is passing. Pulse radar altimeters accurately determine altitude using leading edge return signal tracking. Specifically, a pulse radar altimeter transmits a pulse of radio frequency (RF) energy, and a return echo is received and tracked using a tracking system. The interval of time between signal bursts of a radar system is referred to as a pulse repetition interval (PRI). The frequency of bursts is referred to as a pulse repetition frequency (PRF) and is the reciprocal of PRI.

A radar altimeter mounted on an aircraft transmits a signal that impinges a ground patch bounded by an antenna beam. Radar return signals are typically out of phase with the transmitted radar signal. A method for determining the phase angle of a radar return signal in an interferometric radar system has been previously described. In this method the computed values are filtered in order to improve signal-to-noise ratio. However, such filtering adds latency to the radar altimeter system, and does not take advantage of information available in the original signal.

BRIEF SUMMARY OF THE INVENTION

In one aspect, a method for determining a mechanical angle to a radar target utilizing a multiple antenna radar altimeter is provided. The method comprises receiving radar return signals at the multiple antennas, and populating an ambiguity resolution matrix with the electrical phase angle computations. The method further comprises selecting a mechanical angle from the ambiguity resolution matrix that results in a least amount of variance from the determined electrical phase and using at least one other variance calculation to determine a quality associated with the selected mechanical angle.

In another aspect, a radar processing system for determining a mechanical angle to a target is provided. The radar processing system comprises a plurality of radar antennas receiving radar return signals, and a phase processor receiving the radar return signals from the plurality of radar antennas. The phase processor determines electrical phases between the radar return signals received at each respective pair of antennas. The radar processing system further comprises a phase ambiguity processor receiving the determined electrical phases from the phase processor. The phase ambiguity processor comprises an ambiguity resolution matrix containing the determined electrical phases and a corresponding mechanical angle, and the phase ambiguity processor is programmed to select a mechanical angle from the ambiguity resolution matrix that varies the least from the determined electrical phases and use at least one other variance calculation to determine a quality associated with the selected mechanical angle.

In still another aspect a phase ambiguity processor is provided that comprises a phase ambiguity resolver configured to receive electrical phase differences between received radar return signals reflected from an object. The phase ambiguity processor further comprises an ambiguity resolution matrix containing the determined electrical phases and a corresponding mechanical angle to the object. The phase ambiguity processor is programmed to select a mechanical angle from the ambiguity resolution matrix that varies the least from the determined electrical phases and use at least one other variance calculation to determine a quality associated with the selected mechanical angle.

BRIEF DESCRIPTION OF THE DRAWINGS

FIG. 6 is an ambiguity resolution matrix utilized to determine a mechanical angle to a target based upon electrical phase.

DETAILED DESCRIPTION OF THE INVENTION

FIG. 1 shows an aircraft 2 with the Doppler effect illustrated by isodops as a result of selection by the use of Doppler filters. For ease of description aircraft 2 is assumed to have a vertical velocity of zero. As is known, if a vertical velocity exists, the median 8 of the Doppler effect will shift depending on the vertical velocity. If the aircraft 2 has a vertical velocity in a downward direction, the median of the Doppler would shift to the right of the figure. If the aircraft 2 has a vertical velocity in an upward direction, the Doppler would shift to the left of the figure.

Figure 1A:
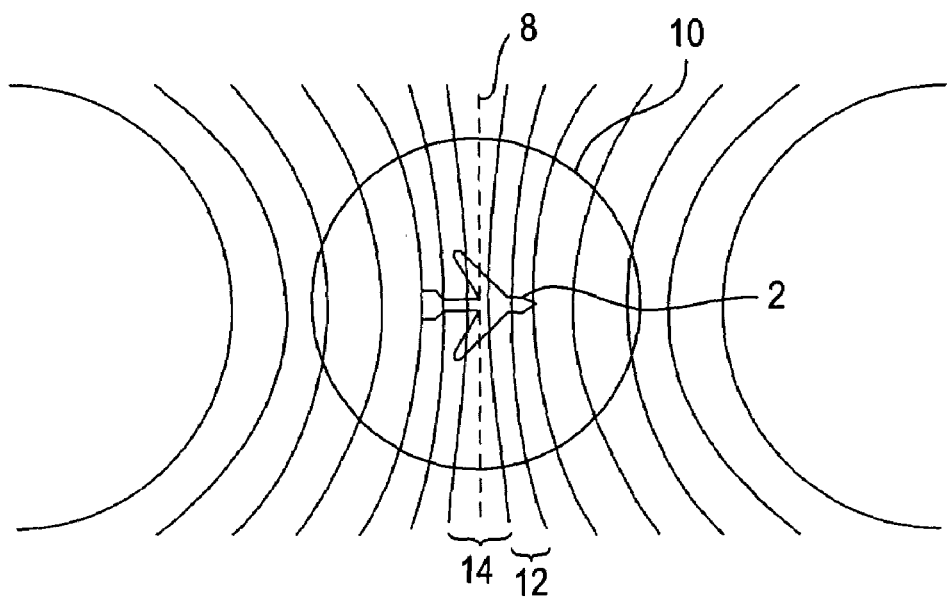
FIG. 1*a* is a diagram illustrating swaths made by a radar.
Figure 1B:
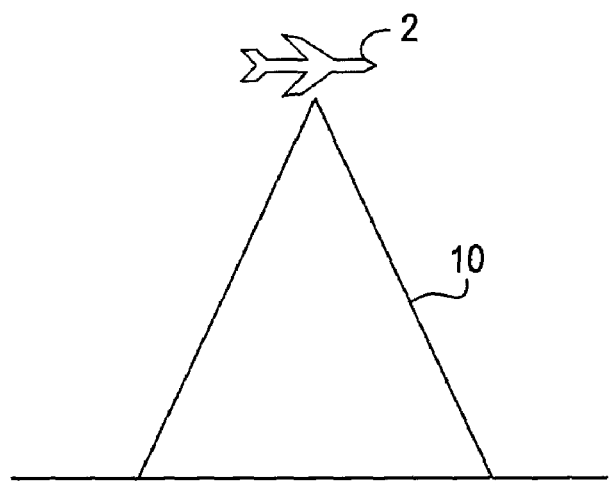
FIG. 1*b* is a diagram illustrating a radar transmit pattern.

There is herein described a combination Doppler radar/interferometer to navigate an aircraft 2 with respect to terrain features below aircraft 2. As used herein, aircraft is used to identify all flight platforms which may incorporate a radar system, including, but not limited to, jets, airplanes, unmanned aerial vehicles, missiles, and guided weapons. The radar also functions with an electronic map, sometimes referred to herein as a digital elevation map (DEM), in determining a position of aircraft 2. In addition to determining an altitude of aircraft 2, an XYZ location of the nearest object to aircraft 2 on the ground, with respect to aircraft 2 in a certain terrain area can be determined. As aircraft 2 is flying over terrain as shown in FIGS. 1*a* and 1*b*, it is important to determine a position of aircraft 2 in accordance with a map. A Doppler filter and range gate are used with a transmitted beam 10 from a transmit antenna (not shown in FIG. 1).

Figure 2:
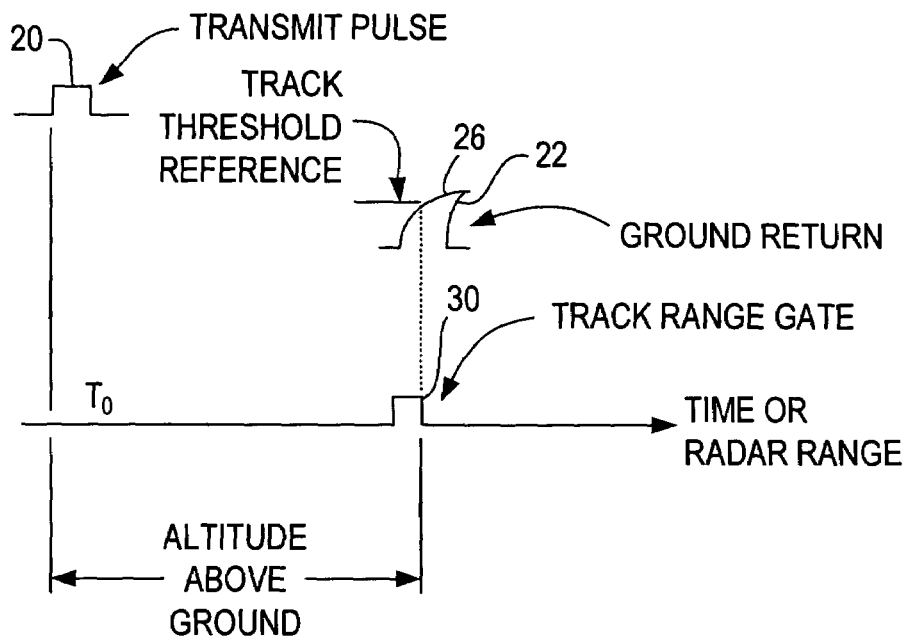
FIG. 2 is an illustration of radar signal waveforms over time.

In a general altitude range tracking radar (e.g. radar altimeter), range is measured and indicated by measuring the time for transmitted energy to be reflected from the surface and returned. With reference to FIG. 2, a radar transmitter repeatedly sends out bursts of electromagnetic energy at a predetermined repetition rate from an antenna, as indicated by transmit pulse 20. Following a time delay which is a function of the aircraft altitude, a ground return pulse 22 is received by a receiving antenna feeding a receiver. A range gate 30 is utilized by the tracking radar to view at least a portion of ground return 22.

Figure 3:
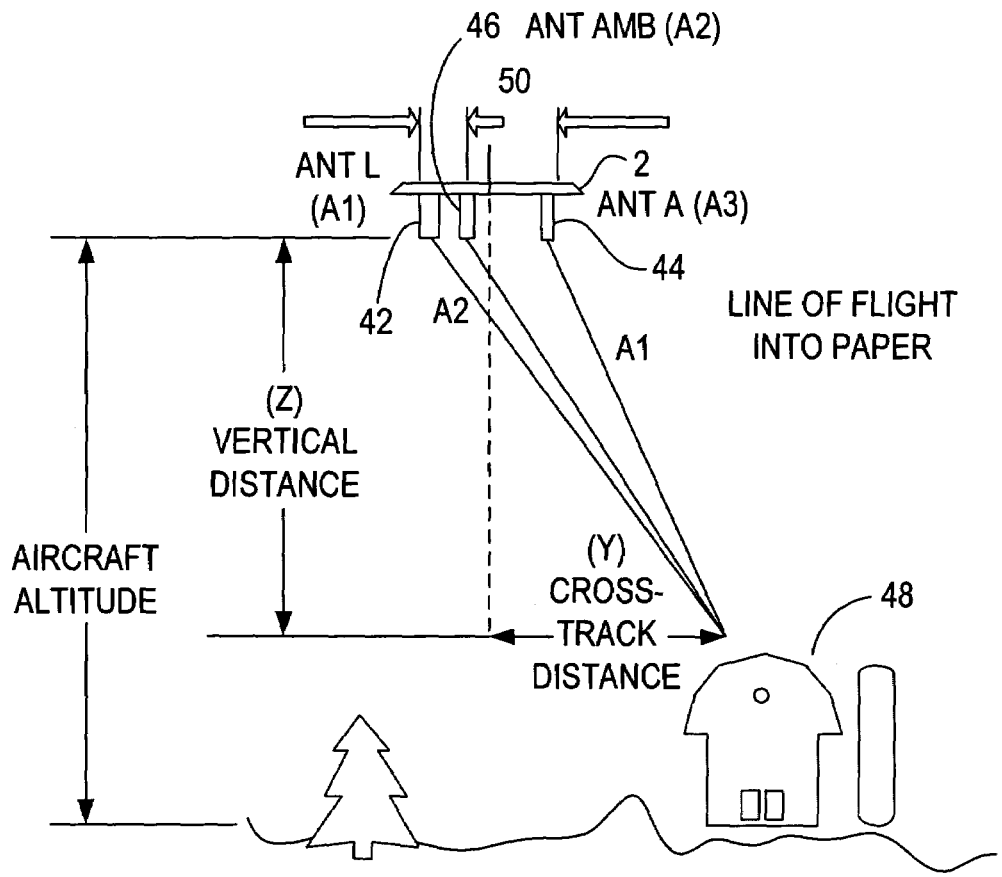
FIG. 3 is a diagram illustrating radar signals being received by three antennas.

Referring to FIG. 3, three receive antennas, a left antenna (A1) 42, a right antenna (A3) 44, and an ambiguous placed antenna (A2) 46 somewhere between antennas 42 and 44, are used to receive information. Though not centered between antennas 42 and 44, antenna 46 is sometimes referred to herein as the central antenna. Along with the three antennas, three processing channels, referred to below as left, right and ambiguous respectively, each include a receiver, a data acquisition device, range gate, and a filter. Use of the three antenna system, along with the processing described herein, provides a solution to ambiguous detected (cross-track) angle of the nearest object. The ambiguous detected angle is due to the spacing of the antennas being greater than the transmitted RF frequency wavelength. By receiving three returns, the processing system is able to determine the unambiguous angle to the nearest object on the ground, which in turn is utilized to locate position of aircraft 2 in body coordinates. Body coordinates are typically preferable than positioning as determined by known systems, as those systems determine position as if the body aircraft 2 is aligned with the line of flight. As aircraft 2 is prone to pitch, roll, and yaw, the body of aircraft 2 is not necessarily aligned with the line of flight.

The method for determining the phase angle of a radar return signal described herein reduces latency by using data available for each radar return measurement to determine the quality of the measurement at the time it is first computed. In a typical application, antennas 42, 44, and 46 are radar strip antennas that are mounted side by side on the underside of an aircraft, with their long axes oriented along the X-axis of the vehicle. In one embodiment, antenna 46 serves as the transmission antenna, and all three antennas serve as receivers. The radar system tracks ground returns by closing a control loop on the leading edge of the returned radar pulses received by antenna 46. Antennas 42 and 44 are used, in conjunction with antenna 46, to determine the cross-track angle of a first ground return.

FIG. 3 illustrates aircraft 2 going into the Figure. During the phase comparison portion of the time interval, the Doppler filters of the left, right and central channels are set to select a swath 14 (shown in FIG. 1) below aircraft 2. Further, both range gates are set at a range directly on the nearest object 48 as previously determined. From this range, right antenna 44 receives a signal from object 48 at a distance of R1, ambiguous antenna 46 receives a signal from the object 48 at a distance of RA, and left antenna 42 receives the signal from object 48 at a distance of R2 where the distance difference is a function of the antenna separation 50 between and amongst the three antennas. A phase processor (described below) compares the phase difference between R1 and RA, R2 and RA, and R1 and R2 once the return signals are received. As illustrated in the Figure, the exact range differences (R2-R1), (RA-R1), and (R2-RA) result in phase differences between the returns and simple trigonometry relations can be utilized to determine the exact crosstrack distance to the object 48 in aircraft body coordinates.

As illustrated in FIG. 3, after the range differences (R2-R1), (RA-R1), and (R2-RA) are determined and knowing the antenna separations 50, and measured range R1, then the crosstrack distance (Y) and vertical distance (Z) can also be computed in aircraft body coordinates. It is important that the precise location of nearest object 48 in each swath is determined so correlation can be made with the electronic maps which will accurately locate the aircraft 2 on the electronic map. For example, at typical high speed aircraft cruising velocities, a radar, configured with reasonably sized Doppler filters, has swath widths of approximately 10 feet at 5000 feet altitude. The resulting incidence angle formed by the intersection of R1 and a vertical line 27 will then be on the order of less than 3 degrees. Basic trigonometry relations show that even with a typical error (for example 1%) on the radar range gate measured distance R1, (50 feet at 5000 feet altitude), knowing the precise antenna separation 50, and precise range differences (R2-R1), (RA-R1), and (R2-RA), the crosstrack distance (Y) will be precise due to the very small incidence angle encountered.

Figure 4:
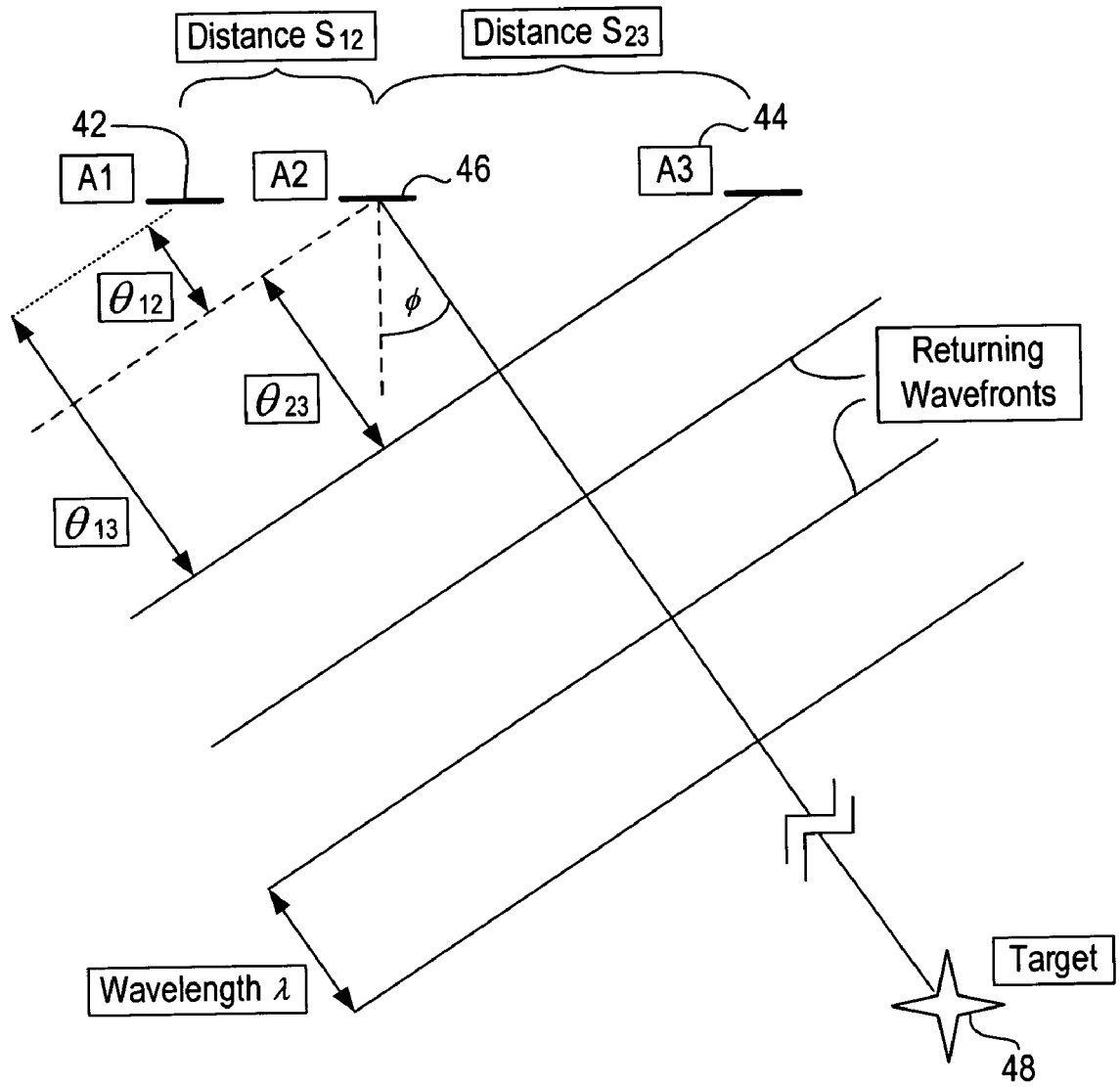
FIG. 4 is an illustration of the three antenna radar system geometry and angular relationships between a target and the three antennas.

FIG. 4 is a further illustration of the three antenna radar system geometry, and the angular relationships between target 48 and the three antennas (A1) 42, (A2) 46, and (A3) 44. As illustrated, the three radar antennas, A1, A2, and A3, are arranged side-by-side, with the center (A2) antenna closer to A1 than to A3. These antennas represent the baseline of a triangulation system that measures the electrical phase angle for a reflected radar pulse between each pair of antennas; A1-A2, A1-A3, and A2-A3. The relationship between the measured electrical phase angle and the mechanical angle of the return, as measured from the antenna centerline, is determined by the wavelength of the radar signal and the separation of the two antennas in each pair. For any given return each pair of antennas will detect a different phase angle, due to the differing separations of the antennas. In the illustration, where, A1, A2, and A3 are the three antennas, the mechanical angle to the target is $\phi$, and the wavelength of the radar signal is $\lambda$. Separation between the electrical centers of antennas 1 and 2 is $S_{12}$, and separation between the electrical centers of antennas 2 and 3 is $S_{23}$. The electrical phase angle between antennas 1 and 2 is $\theta_{12}$, the electrical phase angle between Antennas 1 and 3 is $\theta_{13}$, and the electrical phase angle between Antennas 2 and 3 is $\theta_{23}$.

Due to the geometry of such a radar system, it is possible for the electrical phase angle to exceed 360 degrees, so that a radar return far from the antenna centerline may have the same electrical phase angle as a return that is nearer to the antenna centerline. This produces ambiguity when trying to determine a mechanical angle to a radar target when only electrical phase angles are known. For example, with a 1-foot separation between antennas A1 and A3 and a 4.3 GHz radar signal (wavelength=0.2291 feet), the electrical phase angle will increase from 0 to +180 degrees as the ground return moves from a mechanical angle of 0 degrees (straight below the aircraft) to an angle of 6.55 degrees. As the mechanical angle increases, the electrical phase angle will wrap back to 0 degrees at a mechanical angle of 13.1 degrees. Therefore, with a 2-antenna system it would be impossible to tell the difference between a ground return directly below the aircraft and a ground return 13.1 degrees to either side of the aircraft.

Figure 5:
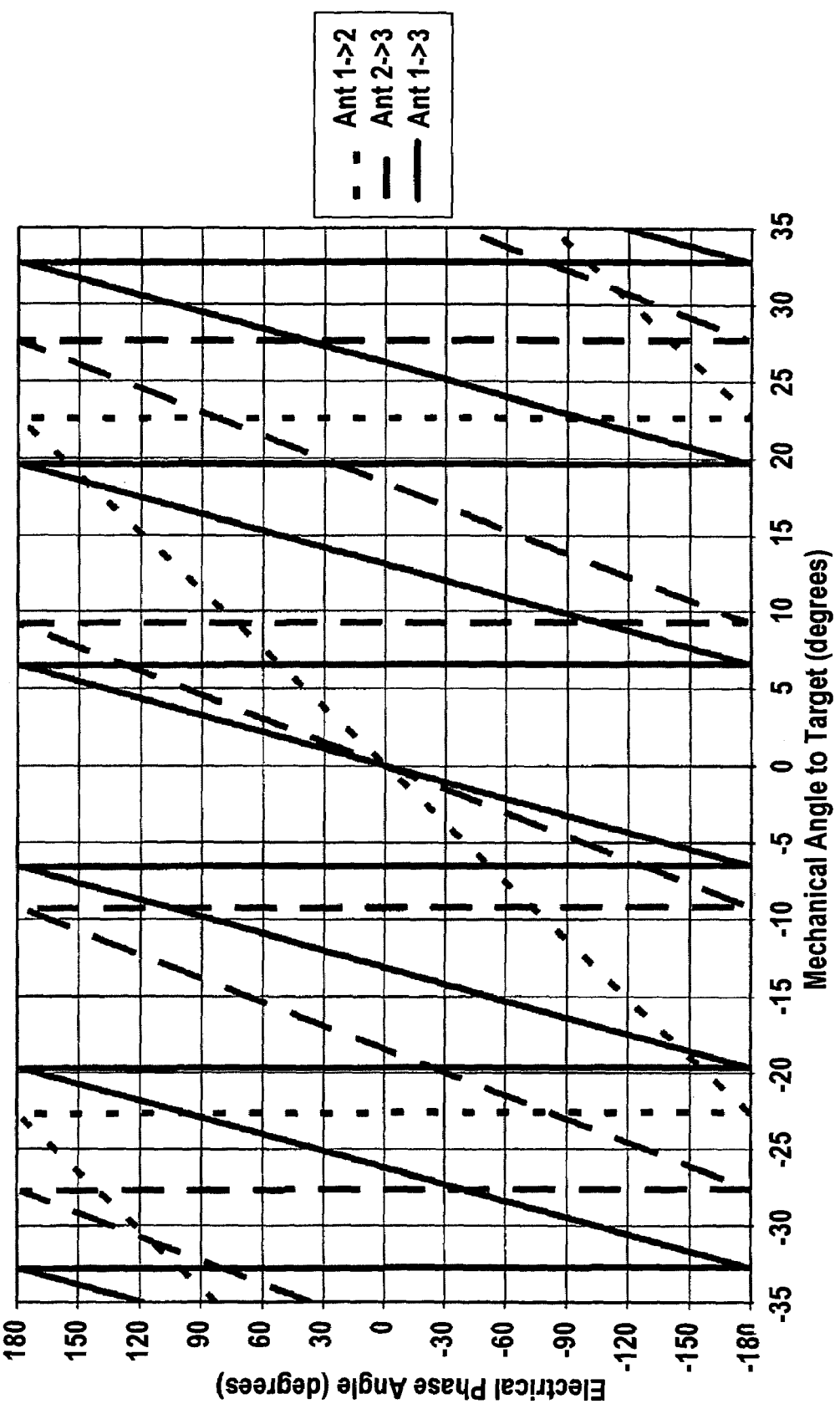
FIG. 5 illustrates electrical phase angle wrapping based on a mechanical angle to a target.

FIG. 5 provides an example of the wrapping of electrical phase angle due to mechanical angle and FIG. 6 is an ambiguity resolution matrix which is utilized to determine a physical angle to a target based upon electrical phase differences. Referring to the ambiguity resolution matrix, K1, K2, and K3 are scale factors that convert electrical phase angle to mechanical angle. The scale factors are computed based on the separation of the antennas and the wavelength of the signal. For any given antenna pair the conversion factor is computed as $K=2\pi S/\lambda$, where S is the separation of the two antennas and $\lambda$ is the wavelength of the radar signal, both expressed in the same units.

A calculated electrical angle phase difference, $\theta$, is equivalent to $[(360 \times S)/\lambda] \times \sin(\Phi))$ or $K \times \sin(\Phi)$, where $\Phi$ is the physical angle of the target in aircraft coordinates, S is a separation between the two antenna elements in feet, and $\lambda$ is a wavelength of the radar signal in feet. In one particular embodiment, separation between the right antenna and the ambiguous antenna is 0.2917 feet (3.5 inches), separation between the ambiguous antenna and the left antenna is 0.7083 feet (8.5 inches), and the separation between the left antenna and the right antenna is 1 foot (12 inches). In the embodiment, the wavelength of the radar is 0.2291 feet. Therefore, in the embodiment, and referring to FIG. 6, K1 is (360×0.2917)/0.2291, or about 458.4, K2 is (360×0.7083)/0.2291, or about 1113.25, and K2 is (360×1)/0.2291, or about 1571.64.

By using the electrical phase measurement from each of the three antenna pairs, with the center antenna closer to A1 than to A3, the ambiguity can be resolved, since the different separations guarantee that the electrical phase angle for each of the three possible antenna pairings will wrap around through 360 degrees at different mechanical angles.

By populating the ambiguity resolution matrix (ARM) of FIG. 6 with the measured electrical phases, along with the possible electrical phases that are multiples of 360 degrees of the measured electrical phases, and then forming all the possible combinations of these electrical phases and the mechanical phases that would have produced these electrical phases, it is possible to unambiguously identify the one mechanical phase angle that has produced the observed electrical phase angles. As varying electrical phase differences between the three antenna pairings are charted, a single mechanical (physical) angle can be determined from the varying electrical phase difference plots for each antenna pairing. That is, for a physical angle, there is one solution which provides a phase difference for each radar channel grouping which is approximately equivalent to the calculated phase differences for the channel groupings.

For a system capable of computing mechanical angles over the range −40 to +40 degrees, there are 75 possible combinations of phase measurements, as shown in the matrix of FIG. 6. As utilized herein, negative mechanical angle values refer to mechanical angles that are on the left side of the aircraft, and positive mechanical angle values refer to mechanical angles that are on the right side of the aircraft. In at least one known radar altimeter configuration, the combination of phase measurements with the lowest variance is selected and all other measurements are ignored.

However, with respect to the embodiments described herein, use of the other 74 variance computations is made in order to determine the quality of the received signal by comparing the best variance to the second best variance. In a high signal-to-noise environment, the best variance will be significantly lower than all other variances (and equal to zero in a perfect system). In a low signal-to-noise environment, the variances will be more nearly equal.

If a radar altimeter receiver could be fabricated that had an infinite signal-to-noise ratio, the variances of the electrical phase measurements at the correct mechanical angle would be zero, and all other variances would be large. However, in a noisy real-world environment, the difference between the variances for the correct mechanical angle solution and the 74 other possible mechanical angle solutions is reduced. A comparison of the lowest variance to the next lowest variances therefore provides an indication of the quality of the measurement. This quality term is available at the time the solution is determined, and is utilized to apply a weighting to the solution or to reject the solution outright. A graphical representation of the effect of noise in the electrical phase measurement on the computed variance for a low noise and high noise environment is shown in FIGS. 7 and 8 where FIG. 7 illustrates the relation between electrical phase and mechanical angle in a low noise environment and FIG. 8 illustrates the same in a high noise environment.

Figure 7:
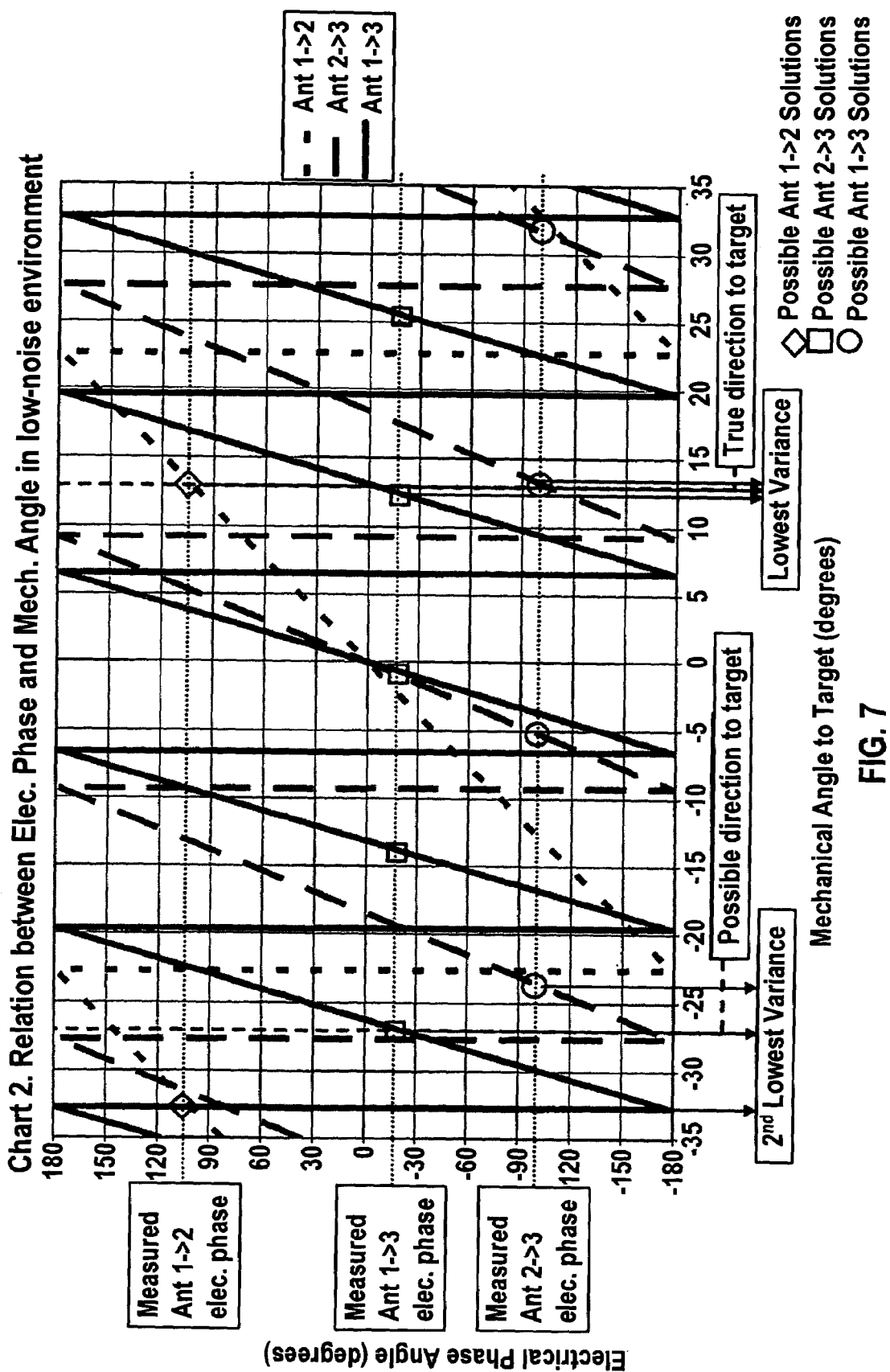
FIG. 7 illustrates the relation between electrical phase and mechanical angle in a low noise environment.
Figure 8:
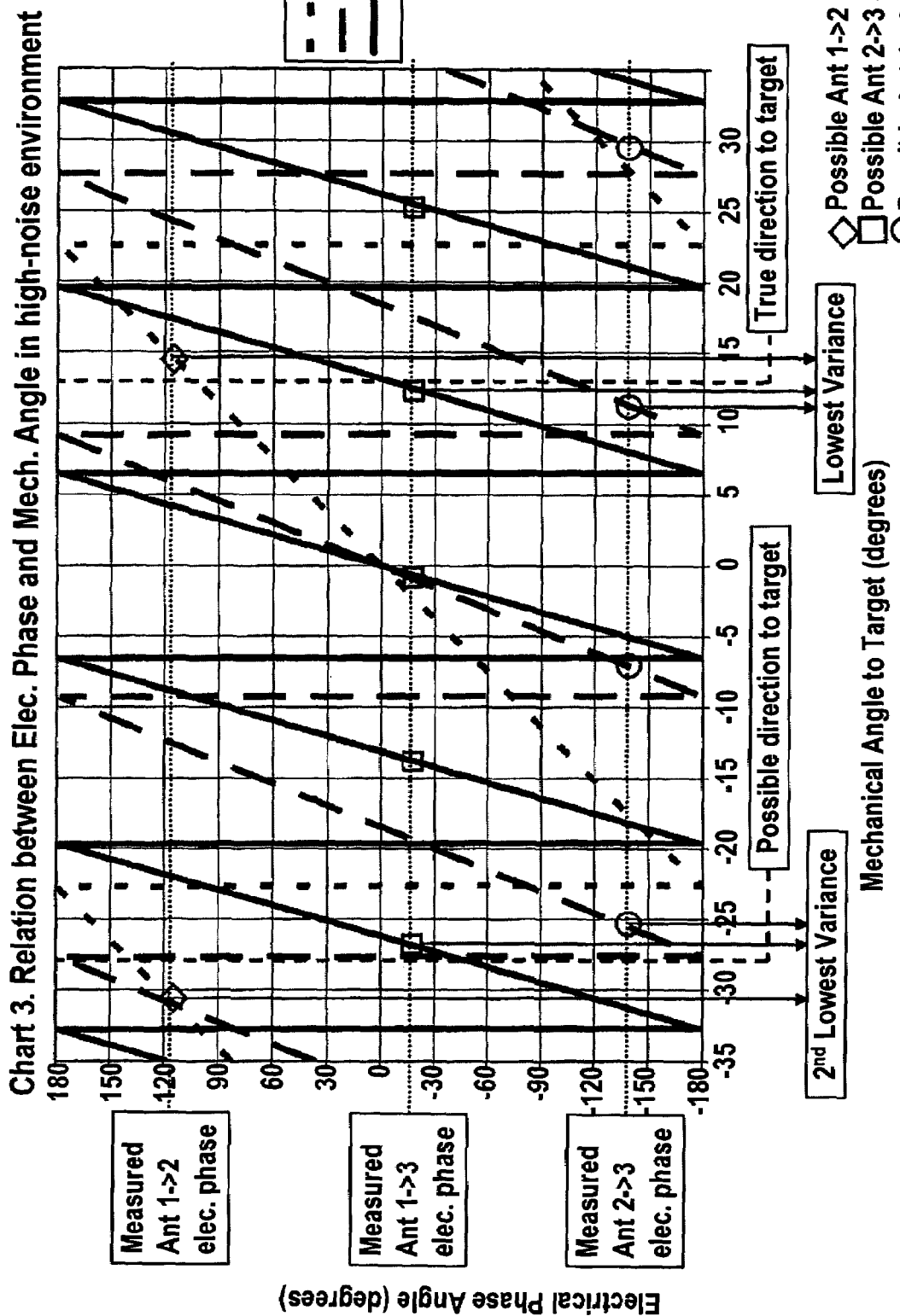
FIG. 8 illustrates the relation between electrical phase and mechanical angle in a high noise environment.

As illustrated in FIG. 7, there is a significant quantitative difference between the best variance and the second best variance in a low-noise environment, making it possible to assign high confidence to the computed mechanical angle. As illustrated in FIG. 8, the situation changes in a high-noise environment. As noise increases any difference between the best variance and the second best variance is reduced, leading to a lower confidence that the computed mechanical angle is the true mechanical angle. In a sufficiently noisy environment the lowest variance may actually lead to selecting the wrong mechanical angle.

Figure 9:
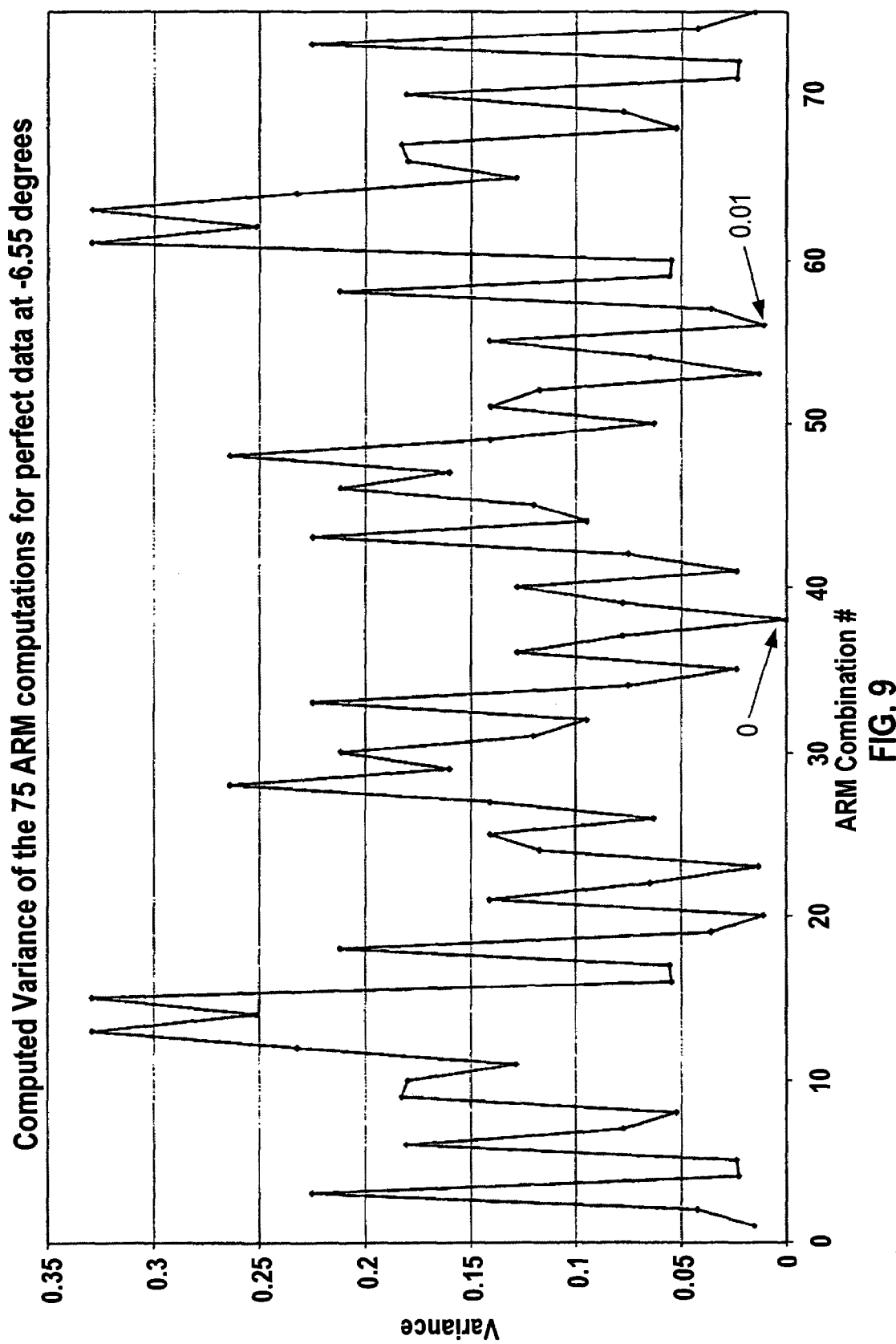
FIG. 9 is a chart illustrating the value of variances computed from all possible combinations of measurements in an ambiguity resolution matrix for perfect data.
Figure 10:
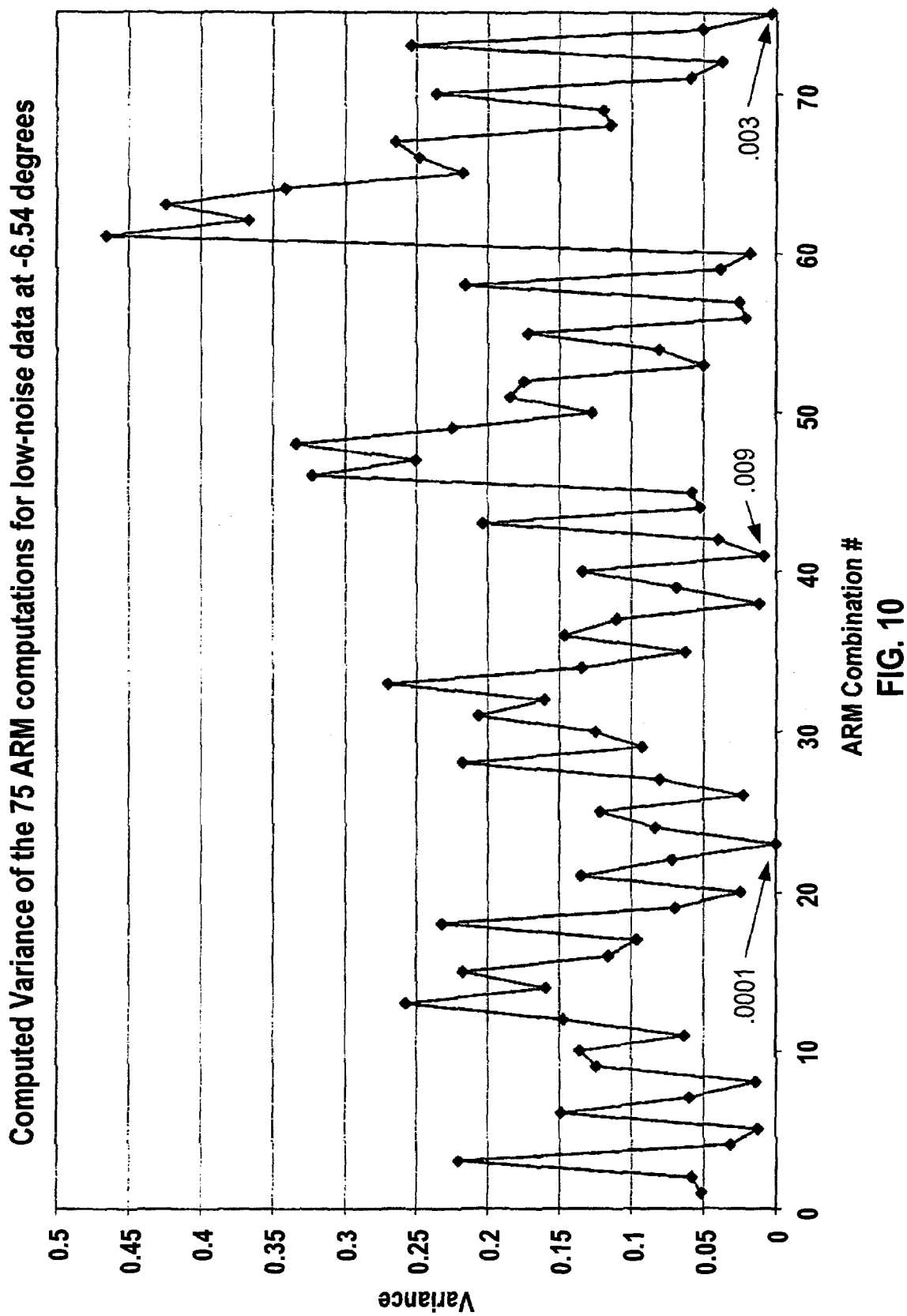
FIG. 10 is a chart illustrating the value of variances computed from all possible combinations of measurements in an ambiguity resolution matrix for an environment known to be low in noise.
Figure 11:
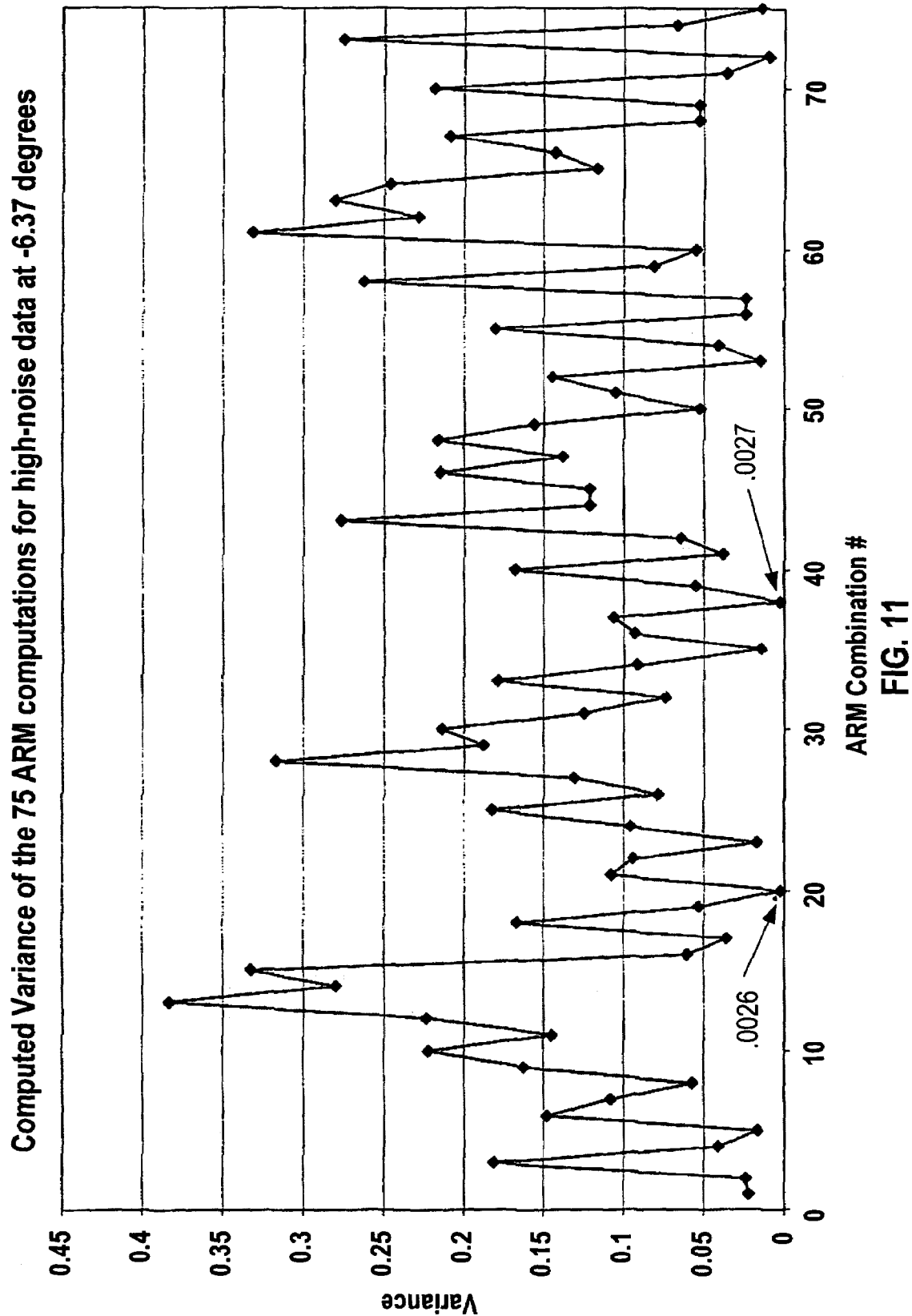
FIG. 11 is a chart illustrating the value of variances computed from all possible combinations of measurements in an ambiguity resolution matrix for an environment known to be high in noise.

FIG. 9 illustrates the value of the 75 variances computed from all possible combinations of measurements in the ambiguity resolution matrix for perfect data. As can be seen, the minimum variance has a value of zero, and no other variance is less than 0.01. FIGS. 10 and 11 utilize real world data to generate the 75 variances which demonstrate the nature of the problem addressed by this disclosure. Specifically, FIG. 10 illustrates the value of the 75 variances computed from all possible combinations of measurements in the ambiguity resolution matrix solution for an environment known to be low in noise. In this example, there is good separation between the best variance of 0.0001 and the second best variance of 0.003. This 30:1 ratio leads to a high degree of certainty that the computed solution is the correct solution, and that noise effects are not likely to have resulted in an incorrect solution from the ambiguity resolution matrix.

However, now referring to FIG. 11, which illustrates the value of the 75 variances computed from all possible combinations of measurements in the ambiguity resolution matrix solution for an environment known to be high in noise, there is little difference between the best variance of 0.0026 and the second best variance of 0.0027. This nearly 1:1 ratio leads to a low degree of certainty that the computed solution is the correct solution. The noise effects have made it impossible to determine which of the two solutions is the correct solution.

The contrast in the results shown in FIGS. 10 and 11 illustrate that by making use of data already computed for the ambiguity resolution matrix, it is possible to determine the quality of the solution, allowing low-quality solutions to be rejected.

Figure 12:
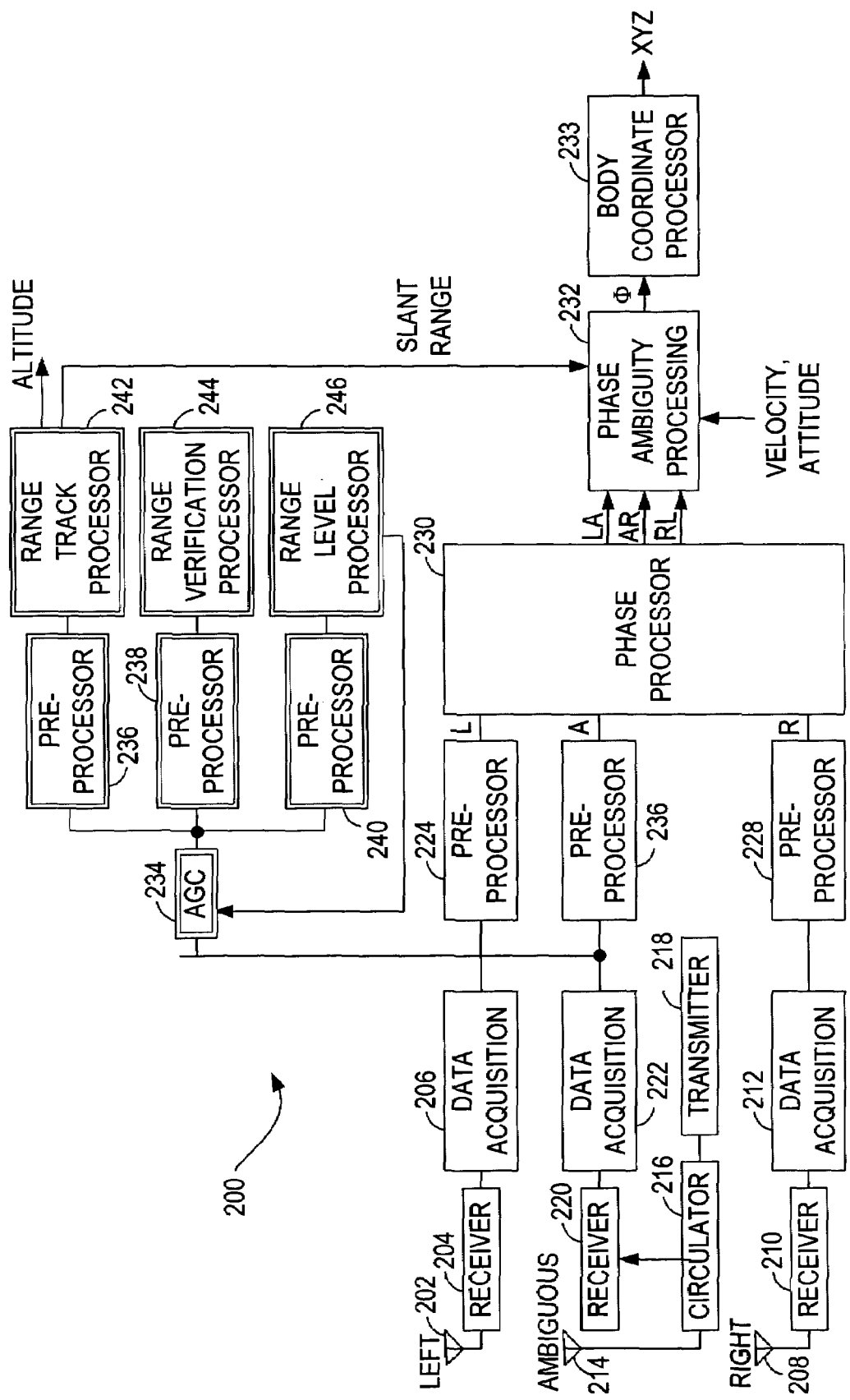
FIG. 12 is a block diagram of a radar signal processing system.

FIG. 12 is one embodiment of a doppler radar processing system 200 configurable to compute a variance for each of the 75 ambiguity resolution matrix calculations described above. System 200 incorporates three radar antennas which receive reflected radar pulses, the pulses having originated from a radar source. A left antenna 202 receives the pulses and forwards the electrical signal to receiver 204. Receiver 204 forwards the received radar signal to a data acquisition unit 206. A right antenna 208 receives the pulses, at a slightly different time than left antenna 202, and forwards the electrical signal to receiver 210. Receiver 210 forwards the received radar signal to a data acquisition unit 212. An offset central (or ambiguously placed) antenna 214 also receives the reflected radar signal, and passes the received signal to a circulator 216. Circulator 216 functions to direct the transmit signal to the antenna, and to direct the received signal from the antenna to receiver 220, thereby allowing a single antenna to be used for both transmitting and receiving. Receiver 220 forwards the received signal to a data acquisition unit 222.

Data acquisition unit 206 provides a digital signal representative of the signal received at left antenna 202 to a left phase pre-processing unit 224. Similarly, representative signals are received at pre-processing units 226 and 228 from data acquisition units 222 and 212, respectively. Data acquisition units 206, 212, and 222 are configured, in one embodiment, to sample received signals, and thereby reduce the data to a rate which allows a relatively low speed computer to process digitized radar data. In one embodiment, pre-processing units 224, 226, and 228 perform a gate ranging function.

A phase processor 230 receives gated, filtered signals, representative of left, right, and central signals received at the antennas, and determines a phase relationship between each of the left and central signal, the right and central signals, and the right and left signals. The phase relationships between the signals are used, along with slant range, velocity and attitude readings in a phase ambiguity processing unit 232 to determine an interferometric (mechanical) angle, Φ, to a target. A body coordinate processor 233 utilizes the interferometric angle, Φ, to determine an XYZ position of, for example, an aircraft employing system 200 with respect to a current aircraft position, sometimes referred to herein as aircraft body coordinates.

A signal from data acquisition unit 222 is also received at an automatic gain control (AGC) unit 234. A signal from AGC unit 234 is passed to pre-processing units 236, 238, and 240. A filtered signal from pre-processing unit 236 is passed to range track processor 242 which provides a slant range signal to phase ambiguity processing unit 232 and altitude information. Pre-processing unit 238 passes a filtered signal to a range verification processor 244. Pre-processing unit 240 passes a filtered signal to a range level processor 246, which also provides a feedback signal to AGC 234.

Figure 13:
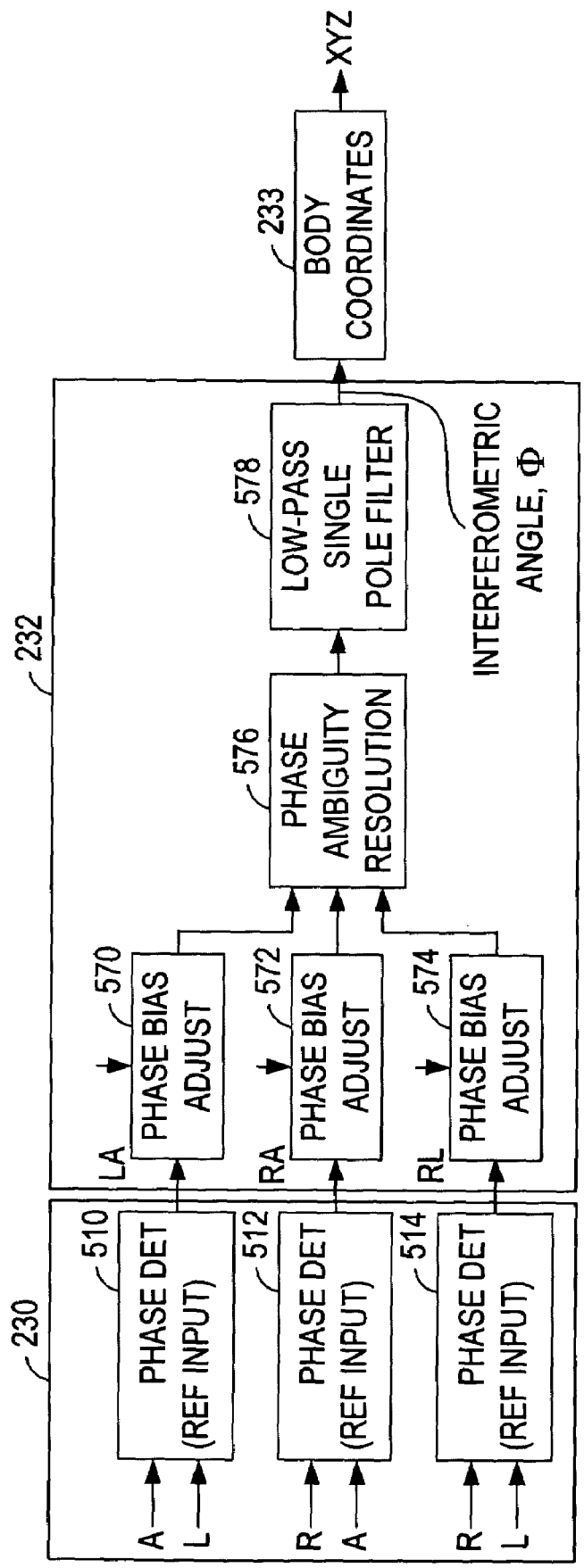
FIG. 13 is a block diagram of an interferometric angle resolver.

FIG. 13 is a block diagram of phase processor 230 (also shown in FIG. 12). Phase processor 230 includes three phase detectors 510, 512, and 514. In one embodiment, phase detectors 510, 512, and 514 are configured with an input and a reference input, and further configured to determine a phase difference between the input and the reference input. Phase processor 230 is configured to receive processed radar return data for all of a left channel, a right channel, and an ambiguous channel. Determination of the electrical phase difference in return data for the three channels allows for an accurate position determination for an object from which radar data was returned and for determination of the mechanical angle between the vehicle and the object that has reflected the radar signals.

In the embodiment shown, phase detector 510 is configured to receive ambiguous channel return data as input, with left channel return data as a reference, and further configured to determine and output a phase difference between the left and ambiguous channels. Phase detector 512 is configured to receive right channel return data as input, with ambiguous channel return data as a reference, and further configured to determine and output a phase difference between the ambiguous and right channels. Phase detector 514 is configured to receive right channel return data as input, with left channel return data as a reference, and further configured to determine and output a phase difference between the left and right channels.

Once phase differences between the right, left, and ambiguous channels has been determined, as described above, the electrical phase differences are used, in one embodiment, to compute the variance of each of the 75 ambiguity resolution matrix computations, and upon determining the solution with the least variance, provide the mechanical angle to the target. FIG. 13 further includes a block diagram of phase ambiguity processing unit 232. In one embodiment, phase ambiguity processing unit 232 is configured to receive an electrical phase difference between the ambiguous channel and the left radar channel from phase detector 510, an electrical phase difference between the right channel and the ambiguous radar channel from phase detector 512, and an electrical phase difference between the right channel and the left radar channel from phase detector 514.

Phase ambiguity processing unit 232 includes a phase bias adjust unit 570 which provides a phase shift value which compensates for phase shifts which occur in the routing of the radar signals, from receipt at an antenna and through cabling and processing areas within aircraft 2. It is accepted that most phase shifting of signals occurs due to cabling for the routing of signals. Phase bias adjust 570 compensates for the ambiguous channel with respect to the left radar channel. Phase bias adjust 572 compensates for the right channel with respect to the ambiguous radar channel. Phase bias adjust 574 compensates for the right channel with respect to the left radar channel.

The compensated phase difference signals are received at a phase ambiguity resolver 576. In one embodiment, phase ambiguity resolver 576 is implemented using software, and provides the above described variance computations to determine the physical (interferometric) angle to a target which originally reflected the radar signals received. In one embodiment, the physical angle signal is filtered utilizing a low-pass filter 578, and an angular position of the target with respect to aircraft body coordinates (X,Y,Z) is determined from the physical angle to the target using body coordinates processor 233.

As antenna separation, radar wavelength, and aircraft position may all affect a timing of radar signals received at the various antennas, phase differences, which are determined as described above, will change at varying rates. In the embodiments described herein, physical angles are calculated for multiple electrical phase differences, and the true physical angle is a solution which provides approximately the same physical angle calculation (e.g., the smallest variance), in each of the three rows (within a couple of degrees). Using the first antenna pairing (left and ambiguous), and based on antenna separation, three possible physical angles are determined from the electrical phase difference received from phase detector 510. As the second antenna pairing (ambiguous and right) are further apart, five possible physical angles are determined. The last antenna pairing (left and right) are the furthest apart, therefore seven possible physical angles are determined. As described above, one of the physical angles from each group of physical angle calculations, will be roughly equivalent, thereby providing an unambiguous physical angle solution. In such a system it is important to note that separation in antenna pairing cannot be a multiple of radar wavelength.

While the invention has been described in terms of various specific embodiments, those skilled in the art will recognize that the invention can be practiced with modification within the spirit and scope of the claims.

What is claimed is:

1. A method for determining a mechanical angle to a radar target utilizing a multiple antenna radar altimeter, said method comprising:
   receiving radar return signals at the multiple antennas;
   populating an ambiguity resolution matrix with the electrical phase angle computations;
   selecting a mechanical angle from the ambiguity resolution matrix that results in a least amount of variance from the electrical phase angle computations; and
   using at least one other variance calculation to determine a quality associated with the selected mechanical angle.

2. A method according to claim 1 wherein populating an ambiguity resolution matrix comprises providing a matrix with electrical phase values based on at least one of a beamwidth of the radar altimeter, a separation between the antennas, and a wavelength of the radar signal.

3. A method according to claim 1 wherein receiving radar return signals at the multiple antennas comprises receiving radar return signals at a left antenna, a right antenna, and a third antenna therebetween, the third antenna closer to one of the right and left antennas.

4. A method according to claim 1 wherein selecting a mechanical angle from the ambiguity resolution matrix comprises calculating a mechanical angle according to $\theta=[(360\times S)/\lambda]\times\sin(\Phi)$, where $\theta$ is a calculated electrical angle phase difference, $\Phi$ is the physical angle of the target, S is a separation between two of the antennas, and $\lambda$ is a wavelength of the radar signal.

5. A method according to claim 1 further comprising separating the radar antennas such that the electrical phase angle for a given pair of antennas will pass through a 360 degree electrical phase at different mechanical angles.

6. A method according to claim 1 wherein using at least one other variance calculation to determine a quality associated with the selected mechanical angle comprises comparing the computation resulting in the least variance with the computation resulting in the second least variance.

7. A radar processing system for determining a mechanical angle to a target, said processing system comprising:
   a plurality of radar antennas receiving radar return signals;
   a phase processor receiving the radar return signals from said plurality of radar antennas, said phase processor determining electrical phases between the radar return signals received at each respective pair of said antennas; and
   a phase ambiguity processor receiving the determined electrical phases from said phase processor, said phase ambiguity processor comprising an ambiguity resolution matrix containing the determined electrical phases and a corresponding mechanical angle, said phase ambiguity processor programmed to select a mechanical angle from the ambiguity resolution matrix that varies the least from the determined electrical phases and use at least one other variance calculation to determine a quality associated with the selected mechanical angle.

8. A radar processing system according to claim 7 wherein said phase ambiguity processor is programmed to utilize said ambiguity resolution matrix to determine a corresponding mechanical angle to a target based upon the determined electrical phases and at least one of a beamwidth of the radar altimeter, a separation between said antennas, and a wavelength of the radar signal.

9. A radar processing system according to claim 7 wherein plurality of radar antennas receiving radar return signals comprises receiving radar return signals at a left antenna, a right antenna, and a third antenna therebetween, the third antenna closer to one of the right and left antennas.

10. A radar processing system according to claim 7 wherein said phase ambiguity processor is programmed to calculate a mechanical angle according to $\theta=[(360\times S)/\lambda]\times\sin(\Phi)$, where $\theta$ is a calculated electrical angle phase difference, $\Phi$ is the physical angle of the target, S is a separation between two of said plurality of antennas, and $\lambda$ is a wavelength of the radar signal.

11. A radar processing system according to claim 7 wherein said radar antennas have a separation therebetween such that the electrical phase angle for each pair of said plurality of radar antennas will pass through a 360 degree electrical phase at a plurality of mechanical angles.

12. A radar processing system according to claim 7 wherein to determine a quality associated with the selected mechanical angle, said phase ambiguity processor is programmed to compare the mechanical angle computation resulting in the least variance with the mechanical phase computation resulting in the second least variance.

13. A radar processing system according to claim 7 wherein said phase ambiguity processor is programmed to compare variances of all the mechanical angle computations within the ambiguity resolution matrix to determine the quality factor associated with any one mechanical angle computation.

14. A phase ambiguity processor comprising a phase ambiguity resolver configured to receive electrical phase differences between received radar return signals reflected from an object, said phase ambiguity processor further comprising an ambiguity resolution matrix containing the determined electrical phases and a corresponding mechanical angle to the object, said phase ambiguity processor programmed to select a mechanical angle from the ambiguity resolution matrix that varies the least from the determined electrical phases and use at least one other variance calculation to determine a quality associated with the selected mechanical angle.

15. A phase ambiguity processor according to claim 14 further comprising at least one phase bias adjust unit configured to provide a phase shift value which compensates for phase shifts which occur in the routing of the radar signals within a radar system, one said phase bias adjust unit for each possible pairing of antennas within the radar system each said phase bias adjust unit configured to output a compensated phase difference signal.

16. A phase ambiguity processor according to claim 14 wherein said phase ambiguity resolver is configured to utilize said ambiguity resolution matrix to determine a corresponding mechanical angle to a target based upon the determined electrical phases and at least one of a beamwidth of the radar altimeter, a separation between antennas, and a wavelength of a radar signal.

17. A phase ambiguity processor according to claim 14 wherein said phase ambiguity resolver is programmed to calculate a mechanical angle according to $\theta=[(360 \times S)/\lambda] \times \sin(\Phi)$, where $\theta$ is a calculated electrical angle phase difference, $\Phi$ is the physical angle of the target, S is a separation between two radar antennas, and $\lambda$ is a wavelength of the radar signal.

18. A phase ambiguity processor according to claim 14 wherein to determine a quality associated with the selected mechanical angle, said phase ambiguity resolver is programmed to compare the mechanical angle computation resulting in the least variance with the mechanical phase computation resulting in the second least variance.

19. A phase ambiguity processor according to claim 14 wherein said phase ambiguity resolver is programmed to compare variances of all the mechanical angle computations within the ambiguity resolution matrix to determine the quality factor associated with any one mechanical angle computation.

20. A phase ambiguity processor according to claim 14 wherein said phase ambiguity resolver is implemented utilizing a software program.

* * * * *